United States Patent
Baudart

(10) Patent No.: US 9,791,719 B2
(45) Date of Patent: Oct. 17, 2017

(54) METHOD OF DETERMINING THE BLOCKING POSITION OF AN OPTICAL LENS

(71) Applicant: ESSILOR INTERNATIONAL (COMPAGNIE GENERALE D'OPTIQUE), Charenton le Pont (FR)

(72) Inventor: Thierry Baudart, Charenton le Pont (FR)

(73) Assignee: ESSILOR INTERNATIONAL (COMPAGNIE GENERALE D'OPTIQUE), Charenton le Pont (FR)

(*) Notice: Subject to any disclaimer, the term of this patent is extended or adjusted under 35 U.S.C. 154(b) by 217 days.

(21) Appl. No.: 14/758,450

(22) PCT Filed: Dec. 31, 2013

(86) PCT No.: PCT/EP2013/078159
§ 371 (c)(1),
(2) Date: Jun. 29, 2015

(87) PCT Pub. No.: WO2014/102385
PCT Pub. Date: Jul. 3, 2014

(65) Prior Publication Data
US 2015/0331256 A1     Nov. 19, 2015

(30) Foreign Application Priority Data

Dec. 31, 2012 (EP) ..................... 12306717

(51) Int. Cl.
*G01B 11/14* (2006.01)
*G02C 7/06* (2006.01)
(Continued)

(52) U.S. Cl.
CPC ............ *G02C 7/068* (2013.01); *B24B 13/005* (2013.01); *B24B 13/0012* (2013.01);
(Continued)

(58) Field of Classification Search
CPC ... B24B 13/00; B24B 13/0031; B24B 13/005; B24B 13/0052; B24B 13/0055;
(Continued)

(56) References Cited

U.S. PATENT DOCUMENTS

| | | | |
|---|---|---|---|
| 4,714,232 A | 12/1987 | Blot | |
| 6,012,965 A * | 1/2000 | Savoie | ................ B24B 13/0055 451/384 |
| 2011/0257930 A1* | 10/2011 | Gourraud | .............. B24B 13/005 702/150 |

FOREIGN PATENT DOCUMENTS

EP     2 199 021     6/2010

* cited by examiner

*Primary Examiner* — Bumsuk Won
*Assistant Examiner* — Ephrem Mebrahtu
(74) *Attorney, Agent, or Firm* — Oblon, McClelland, Maier & Neustadt, L.L.P.

(57) ABSTRACT

Method for determining a position of an optical lens member placed on a lens blocking ring (22). A reference system, blocking ring data, and optical lens member surface data are provided. Position parameters are provided defining a position of a reference point of the surface of the lens member with respect to the main plane of the reference system and an orientation, about the main axis of said placed surface at said reference point. The position of the placed surface is determined according to the position parameters. During a repositioning step (S6) the placed surface is virtually translated and rotated. During an altitude determination step (S7) a difference in position between the blocking ring and the placed surface is determined. The repositioning and altitude determining steps (S6, S7) are repeated so as to minimize the difference in position between the blocking ring and the placed surface.

17 Claims, 4 Drawing Sheets

(51) Int. Cl.
*G01M 11/02* (2006.01)
*B24B 13/005* (2006.01)
*B24B 13/00* (2006.01)
*B29D 11/00* (2006.01)

(52) U.S. Cl.
CPC ...... *B24B 13/0052* (2013.01); *B24B 13/0055* (2013.01); *B29D 11/00942* (2013.01); *B29D 11/00961* (2013.01); *G01B 11/14* (2013.01); *G01M 11/0221* (2013.01)

(58) Field of Classification Search
CPC ....... B24B 13/0057; B24B 9/14; B24B 9/142; B24B 47/22; B24B 47/225; B24B 49/12; B29D 11/00009; B29D 11/00019; B29D 11/00028; B29D 11/00038; B29D 11/00932; B29D 11/00942; G02C 7/02; G02C 7/024; G02C 7/028; G01M 11/0221
USPC ................ 351/159.73; 700/56–61, 186, 187; 702/150, 155; 703/22
See application file for complete search history.

METHOD OF DETERMINING THE BLOCKING POSITION OF AN OPTICAL LENS

RELATED APPLICATIONS

This is a U.S. national stage application under 35 USC §371 of application No. PCT/EP2013/078159, filed on Dec. 31, 2013. This application claims the priority of European application no. 12306717.5 filed Dec. 31, 2012, the entire content of which is hereby incorporated by reference.

FIELD OF THE INVENTION

The present invention relates to a method for determining a position of an optical lens placed on a lens blocking ring.

BACKGROUND OF THE INVENTION

The discussion of the background of the invention herein is included to explain the context of the invention. This is not to be taken as an admission that any of the material referred to was published, known or part of the common general knowledge at the priority date of any of the claims.

An optical lens is typically made of plastic or glass material and generally has two opposing surfaces which co-operate with one another to provide a required corrective prescription. When the positioning or shape of one of these surfaces with respect to the other is inaccurate, optical errors can be created.

Manufacturing of an optical lens to the required prescription requirements typically includes machining the surface of a semi-finished lens or lens blank. Typically, a semi-finished lens has a finished surface, for example the front surface and an unfinished surface, for example the back surface. By machining the back surface of the lens to remove material, the required shape and positioning of the back surface with respect to the front surface for the desired corrective prescription can be generated.

During manufacturing of the lens it is important that the semi-finished lens is securely maintained in an accurate position in order to prevent the generation of optical errors. Therefore, the manufacturing method comprises a blocking step during which the semi-finished lens is blocked on a blocker.

During the blocking step, the semi-finished lens is maintained by blocking the finished surface of the lens on a blocking ring. Various materials may be employed to secure the semi-finished lens to the blocking ring. These materials include low temperature fusible metal alloys and thermoplastic materials.

The position of the optical lens on the blocking ring can be of great importance so as to assure an accurate position of the manufactured surface.

In particular when manufacturing an optical lens one may wish to control the prism of the manufactured optical lens. The control of such prism requires controlling accurately the position of the optical lens on the blocking ring.

Furthermore, recent designs of progressive ophthalmic lenses include a combination of two complex surfaces, for example two aspherical surfaces, such as two progressive or regressive surfaces. When combining two complex surfaces, the relative position of both surfaces is of great importance for the optical function of the manufactured ophthalmic lens. Therefore, the semi-finished lens member has to be blocked in an accurate position during the blocking step or at least one needs to be able to determine the blocking position.

SUMMARY OF THE INVENTION

One object of the present invention is to provide a method for determining the position of an optical lens member having a surface placed on a lens blocking ring, the blocking ring comprising a bearing zone arranged to bear at least partially the placed surface (11) of the optical lens member when said optical lens member is placed on the lens blocking ring.

The method according to one aspect of the invention, for example implemented by computer means, comprises:

a reference system providing step during which a reference system is provided, the reference system comprises a main axis perpendicular to a main plane defined by two axes perpendicular to each other and to the main axis, a blocking ring data providing step during which blocking ring data representing, in the reference system, a plurality of at least three points of the bearing zone, is provided;

an optical lens member surface data providing step, during which optical lens member surface data is provided, the optical lens member surface data representing, in the reference system, the placed surface of the optical lens member to be placed on the blocking ring, a position parameters providing step during which position parameters are provided, the position parameters defining a position of a reference point of the placed surface with respect to the main plane of the reference system and an orientation, about the main axis of said placed surface at said reference point, an initial position determining step during which the position of the placed surface of the optical lens member is determined according to the position parameters, a repositioning step during which the placed surface is virtually translated along the main axis and rotated about the two perpendicular axes, from said initial position, to be set in a virtual position, an altitude determination step during which a difference in position along the main axis between each of the points of the blocking ring data and the placed surface of the optical lens member in said virtual position is determined, wherein the repositioning and altitude determining steps are repeated so as to minimizing the difference in position along the main axis between the points of the blocking ring data and the placed surface of the optical lens member and by imposing that for each point of the blocking ring data, the distance in position along the main axis with the placed surface of the optical lens member is greater than or equal to zero for determining complementary position parameters of the optical lens member.

Advantageously, the method according to an embodiment of the invention allows determining accurately the position in a reference system of any optical lens member when said optical lens member is placed on a blocking ring. In particular, the method according to the invention allows determining the complementary position parameters of an optical lens member placed on a lens blocking ring, knowing the surface of the optical lens member to be placed on the lens blocking ring, the bearing surface of the lens blocking ring and three of the position parameters of the optical lens.

Furthermore, the method according to an embodiment of the invention may be implemented with any type of blocking ring, the only requirement being to have data representing at least part of the bearing surface of the blocking ring.

The method according to an embodiment of the invention may advantageously be used for any optical lens, given that one knows the surface of the optical lens to be placed on the lens blocking ring.

According to further embodiments which can be considered alone or in combination:

the bearing zone of the blocking ring has a circular shape; and/or the blocking ring data comprise points arranged so as they are spaced by an angular distance greater than or equal to 0.5 degree and smaller than or equal to 2 per degree; and/or the bearing zone of the blocking ring is comprised in a plane perpendicular to the main axis; and/or the points are located on an arc of the blocking ring having an angle greater than or equal to 60°; and/or the optical lens member surface data is a representation at least twice derivable of the placed surface; and/or the placed surface is an aspherical surface; and/or the optical lens member is used to manufacture an ophthalmic lens; and/or the ophthalmic lens is a progressive multifocal ophthalmic lens and the reference point of the placed surface is the prism reference point of the progressive multifocal ophthalmic lens; and/or during the initial positioning step, the placed surface is oriented so as to have the near vision part of the progressive multifocal ophthalmic lens facing the bearing zone; and/or during the initial positioning step, the placed surface is oriented so as to have the far vision part of the progressive multifocal ophthalmic lens facing the bearing zone; and/or the position parameters are measured on the optical lens member when the optical lens member is placed on the blocking ring.

Another aspect of the invention relates to a method of manufacturing an optical surface of an optical lens comprising:

an optical lens member providing step, during which an optical lens member having a first optical surface and a second optical surface to be manufactured is provided, a blocking step during which the first surface of the optical lens member is placed on a blocking ring and blocked to a holding lens member, a manufacturing step during which the second surface of the optical lens is manufactured according to manufacturing parameters, wherein the position of the first surface of the optical lens member on the blocking ring at the blocking step is determined using a method according to the invention;

wherein the manufacturing parameters are determined from the position parameters and the complementary position parameters determined when carrying out the method according to the invention.

According to a further aspect, the invention relates to a computer program product comprising one or more stored sequences of instructions that are accessible to a processor and which, when executed by the processor, causes the processor to carry out the steps of the method according to the invention.

Another aspect of the invention relates to a computer readable medium carrying one or more sequences of instructions of the computer program product according to the invention.

Another aspect of the invention relates to a program which makes a computer execute the method of the invention.

Another aspect of invention relates to a computer-readable storage medium having a program recorded thereon; where the program makes the computer execute the method of the invention.

Another aspect of the invention relates to a device comprising a processor adapted to store one or more sequence of instructions and to carry out at least one of the steps of the method according to the invention.

Unless specifically stated otherwise, as apparent from the following discussions, it is appreciated that throughout the specification discussions utilizing terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Embodiments of the invention will now be described, by way of example only, and with reference to the following drawings in which.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

DETAILED DESCRIPTION OF THE DRAWINGS

In the sense of the invention, a "Design" is a widely used wording known from the man skilled in the art to designate the set of parameters allowing to define an optical function of a generic optical system; each ophthalmic lens manufacturer has its own designs, particularly for aspherical lens and for progressive lens. As for an example, a progressive lens "design" results of an optimization of the progressive surface so as to restore a presbyope's ability to see clearly at all distances but also to optimally respect all physiological visual functions such as foveal vision, extra-foveal vision, binocular vision and to minimize unwanted astigmatisms. Progressive lens "designs" are tested through rigorous clinical trials before being commercialized.

In the context of the present invention the term "optical lens member" can refer to a lens blank, an uncut lens, a semi-finished lens. It will be understood that the method can thus be applied to any stage of the manufacturing process of an ophthalmic lens.

As indicated previously, when one needs to machine a surface of an optical lens one previously to the machining step has the optical lens member blocked on the opposite surface to the surface to be manufactured.

Typically, a method for manufacturing an optical lens comprises:

an optical lens member providing step,
an optical lens member blocking step, and
a machining step.

During the optical lens member providing step, an optical lens member is provided, for example a semi-finished optical lens.

Figure 1A:
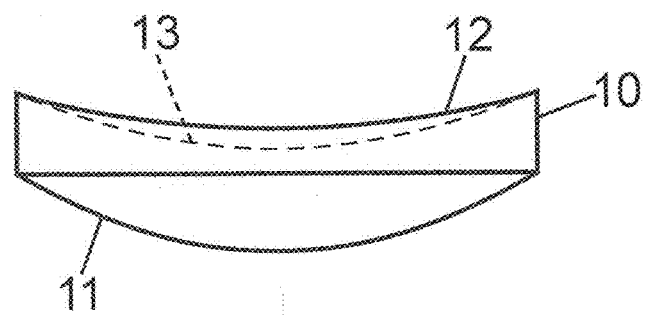
FIG. 1A is a side view of an optical lens member to be manufactured.

As represented on FIG. 1A the optical lens member 10 has a first surface with a first design, for example a preformed aspherical front surface. In use of the resulting finished optical lens, the preformed front surface 11 is disposed nearest the object being viewed. The optical lens member 10 further comprises a second surface 12 to be modified by the manufacturing method so as to provide for example the back surface 13 of the finished optical lens, represented by the dotted line. Second surface 12 is machined by a machining tool so that the back surface 13 is orientated with respect to and distanced from the front surface 11, according to a required optical prescription.

While in this embodiment of the invention, the first surface is the front surface of the lens member and the second surface is the back surface, it will be understood, that in alternative embodiments of the invention the first surface may be the back surface of the lens member and the second surface may be the front surface.

Furthermore, while in this embodiment of the invention, the back surface of the optical lens is formed by the manufacturing method, it will be understood, that in alternative embodiments of the invention both or either surfaces of the lens may be formed by the manufacturing method.

Moreover, although the surface 13 to be manufactured is represented in FIG. 1A as concave, it will be appreciated that this surface 13 could equally well be convex or any other curved surface.

Figure 1B:
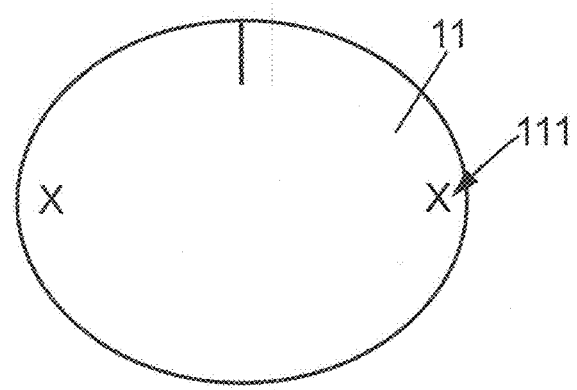
FIG. 1B is a planar top view of a preformed surface of a semi-finished lens member to be machined.

With reference to FIG. 1B, reference markings 111 are provided on the first surface 11 of the lens member 10 as reference features for defining a first reference system for positioning of the first design of the first surface.

The reference markings 111 may be engraved markings have a depth of a few micrometers so as to limit the risk of disturbing the wearer of the resulting finished optical lens. The reference markings may also be temporary markings, for example using a removable ink. Advantageously, the reference markings 111 are positioned such as they do not appear on resulting finished optical lens after edging operations.

Figure 2:
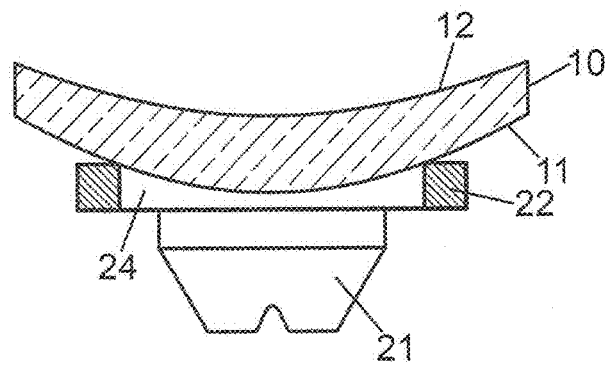
FIG. 2 is a cross-section view of an optical lens member having a surface placed on a blocking ring according to an embodiment of the invention.

As illustrated on FIG. 2, during the optical lens member blocking step, the first surface 11 of the lens member 10 is placed on a lens blocking ring 22. A blocking cast material is poured in the cavity 24 defined by the first surface 11, the lens blocking ring 22 and a top surface (not represented) of an insert 21.

Although on FIG. 2, the optical lens member 10 is represented has having a first surface 11 spherical, the invention is most advantageous for optical lens member 10 having an aspheric al first surface.

Figure 4:
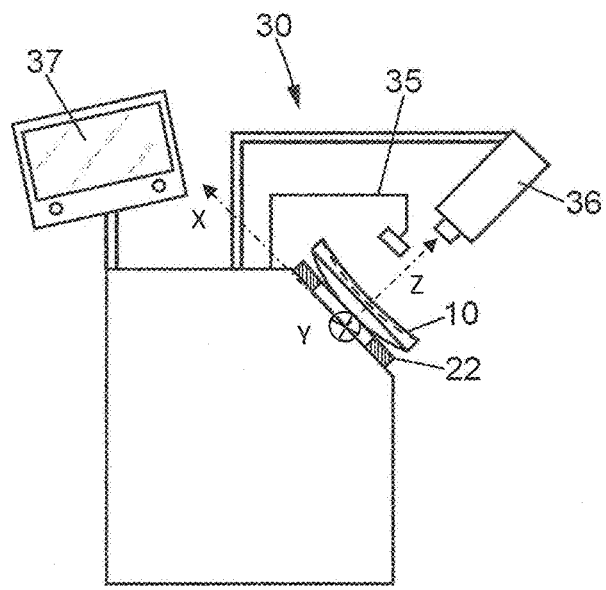
FIG. 4 is schematic view of an optical lens member on a blocking station.

As illustrated on FIG. 4, a blocking station 30 may be used for the optical lens member blocking step. The blocking station 30 comprises a clamping arm 35 which may be moved from a free position to a clamping position in which it holds the lens member 10 in place on the lens blocking ring 22. Blocking station 30 also includes a digital camera 36 for taking an image of the positioning of the lens member 10 on the blocking ring 22, and a screen 37 for viewing the image from the digital camera 36. The lens member 10 may also be directly viewed by an operator without using the digital camera 36.

Once, the operator has positioned the lens member in a predetermined position on the blocking ring the optical lens is clamped using the clamping arm 35. The casting material may then be poured in the cavity 24.

So as to place the lens member in a predetermined position; the operator uses the digital camera and the screen 37 to visualize reference markings on the first surface 11 of the lens member 10. The image of the reference markings 111 on the first surface 11 of the lens member 10 is compared to a computer generated target on the screen 37. The operator places the lens member so that the image of the reference markings 111 of the first surface 11 of the lens member 10 and the computer generated target superpose.

Figure 3:
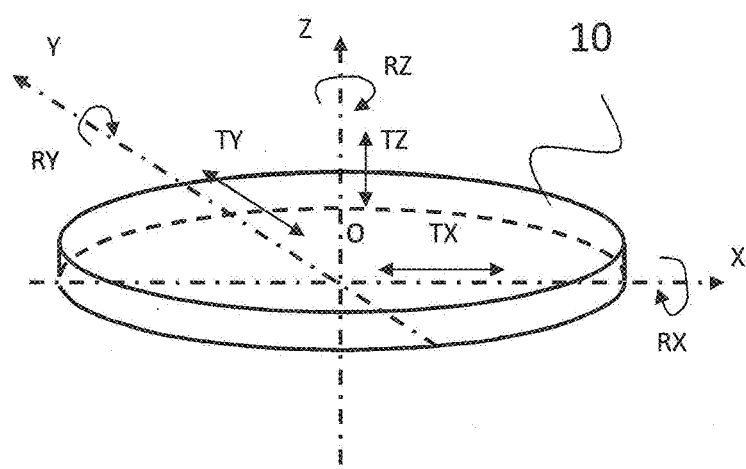
FIG. 3 is a perspective view of a preformed surface of an optical lens member illustrating a reference system and the position parameters.

As illustrated on FIG. 3, the position of the lens member 10 is defined in a reference system comprising a main axis Z perpendicular to a main plane (X, Y) defined by two axes X, Y perpendicular to each other and to the main axis Z. The position of the lens member, in particular of the first surface 11 of the lens member 10 in such reference system is defined by six parameters. Among the six parameters, three are translation parameters TX, TY and TZ along each axis X, Y, and Z and three are rotation parameters RX, RY, and RZ about each of the axis X, Y, and Z. The reference system is also shown on FIG. 4.

When positioning the lens blank on the blocking ring using the blocking station 30, an operator controls only three of the six parameters, i.e. the rotation RZ about the main axis Z and the translations TX and TY along the axis X and Y.

Three complementary position parameters TZ, RX and RY are constrained by the shape of the first face and the shape of the bearing zone.

The other three complementary position parameters TZ, RX and RY are to be determined accurately using computer means and an appropriate method. When the placed surface of the optical lens member is aspherical the three rotation parameters are of great importance.

Figure 5:
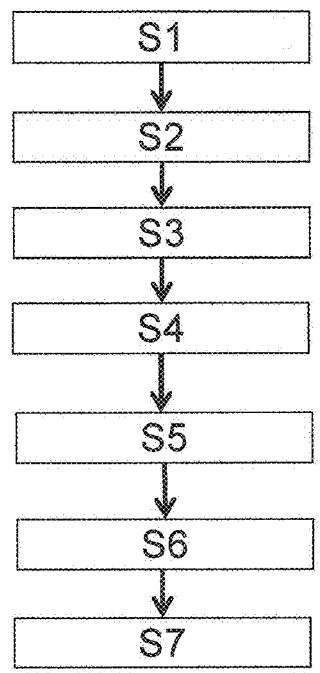
FIG. 5 is a flowchart of the steps of a method according to the invention.

The method of the invention is such an appropriate method. As illustrated on FIG. 5, the method for determining the position of an optical lens member placed on a lens blocking ring according to the invention comprises:
- a reference system providing step S1,
- a blocking ring data providing step S2,
- an optical lens member surface data providing step S3,
- a position parameters providing step S4,
- an initial position determining step S5,
- a repositioning step S6, and
- an altitude determination step S7.

The method of the invention is to be implemented by computer means.

During the reference system providing step S1, a reference system comprising a main axis (Z) perpendicular to a main plane (X, Y) is provided. The main plane (X,Y) is defined by two axes perpendicular to each other and to the main axis (Z). The center (O) of such reference system is defined as the intersection point of the main axis (Z) with the main plane (X, Y).

During the blocking ring data providing step S2, blocking ring data is provided.

Different type of blocking ring may be used during the optical lens member blocking step.

As disclosed in U.S. Pat. No. 4,714,232 the blocking ring may be in the form of a bearing ring having three bearing areas for contact with a semi-finished blank arranged circumferentially around an axis and at the vertices of an isosceles triangle, each bearing area having a plurality of facets which conjointly form a globally convex combination.

Although this solution minimizes the risk associated with the appearance of prism during positioning of the semi-finished blank, the risk is not eliminated entirely and producing such type of blocking ring is very expensive.

Another type of blocking ring comprises three pegs, each peg having a cylindrical body that is extended by a spherical surface head. The first surface of the optical lens is placed on the spherical surface heads. The use of such blocking ring combined with an appropriate method provides a good control of the blocking position of the optical lens member. However, such blocking ring remains expensive to produce.

Figure 6:
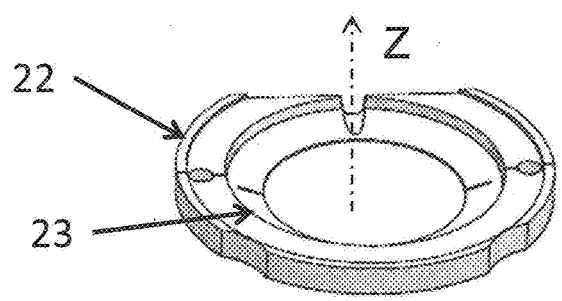
FIG. 6 is a perspective view of a blocking ring.

As represented on FIG. 6, a low cost production blocking ring may simply comprise an annular bearing zone 23 having globally a circular symmetry about an axis Z. The bearing zone is arranged to bear at least partially the placed surface of the optical lens member when said optical lens member is placed on the blocking ring.

According to an embodiment of the invention, the bearing zone is located within the main plane and the center of the reference system is located at a geometrical center of the bearing zone 23.

According to an embodiment of the invention, the blocking ring has a cylinder shape whose revolution axis is parallel to the main axis (Z). The blocking ring may have a constant height along the main axis. The shapes of the blocking rings tend to be as simple as possible so as to reduce the cost of such blocking ring.

When the lens member is clamped against the lens blocking ring, only part of the blocking ring is in contact with the first surface of the lens member.

Indeed, the clamping arm 35 of the blocking station usually has an offset, i.e. the point of the second surface of the lens member where the clamping arm is clamped does not correspond to the center of the lens member and the first surface of the lens member is usually asymmetric.

Therefore, the bearing zone may represent only part of the surface of the blocking ring: the part that is to be in contact with the first surface of the lens member.

As represented on FIG. 6, according to an embodiment of the invention, the bearing zone 23 has a circular shape and may be comprised in a plane perpendicular to the main axis (Z). Although not represented, the bearing zone may have an elliptic shape.

According to an embodiment of the invention, the bearing zone data represent an arc of the blocking ring, the arc having an angle greater than or equal to 60°, for example greater than or equal to 120°, for example greater than 170°, and smaller than or equal to 300°, for example smaller than or equal to 240°, for example smaller than 190°. The summit of the arc is positioned at the geometrical center of the bearing zone.

The blocking ring data comprises data representing, in the reference system provided during the reference system providing step, a plurality of point of the bearing zone. The plurality of points comprises at least three points, for example at least 10 points, for example the blocking ring data comprise one point per degrees aver the bearing area.

According to an embodiment, the blocking ring data comprise points arranged so as they are spaced by an angular distance greater than or equal to 0.5 degree and smaller than or equal to 2 per degree. The reference of the angles is the center of the blocking ring.

The points comprised in the blocking ring data, are also named "sampling points".

During the optical lens surface data providing step S3, optical lens member surface data representing in the reference system the placed surface of the optical lens is provided. For example the optical lens member surface data represent the first surface 11 of the lens member 10. According to an embodiment of the invention, the optical lens member surface data is a representation at least twice derivable of the placed surface of the optical lens member. The optical lens surface member surface data may be a surface function representation of the optical surface, using for example NURBS representations, i.e. Non-Uniform Rational Basis Splines.

As indicated previously, according to an embodiment of the invention, the placed surface may be asymmetric, for example aspherical.

During the position parameters providing step S4, position parameters of the placed surface are provided. The position parameters define the position of a reference point of the surface of the optical lens to be placed on the blocking ring in the main plane of the reference system and the orientation of said surface about the main axis of the reference system. The position parameters correspond to the parameters the operator may control when placing the lens member on the blocking ring, i.e. the rotation RZ about the main axis Z and the translations TX and TY along the axis X and Y. RZ is controlled through the clamping arm, and TX, TY are controlled by an operator by aligning a reference point of the first surface on a reference marks located on the blocking station.

According to an embodiment of the invention, the optical lens member is used to manufacture an ophthalmic lens.

The reference point of the surface of the optical lens member to be placed on the blocking ring may be any point of the surface, for example when the optical lens is a progressive ophthalmic lens, the reference point is the prism reference point. However, the geometrical center of the first surface or the barycenter of the first surface can be used as reference point.

During the initial position determining step S5, the position of the placed surface of the optical lens member is determined. In other words, using the optical lens member surface data, the blocking ring data and the position parameter, an initial position of the placed surface of the optical lens member relative to the blocking ring is determined.

For example, the blocking ring is placed in the main plane (X,Y) and perpendicular to the main axis Z. The placed surface is placed relatively to the blocking ring according to the three positioning parameters. The three other parameters TZ, RX, and RY may be given an arbitrary value under the condition that the placed surface of the optical lens is above the blocking ring.

According to an embodiment of the invention, the optical lens is a progressive multifocal ophthalmic lens and during the initial positioning step, the placed surface is oriented so as to have the near vision part of the progressive multifocal ophthalmic lens facing the at least part of the surface of the blocking ring. In other words, the parameter corresponding to the rotation about the main axis Z is so that the placed surface is oriented so as to have the near vision part of the progressive multifocal ophthalmic lens facing the bearing zone of the blocking ring. According to such embodiment, the optical lens may be placed so that the clamping arm in the clamping position pushes against the near vision part of the progressive multifocal ophthalmic lens.

According to an embodiment of the invention, the optical lens is a progressive multifocal ophthalmic lens and during the initial positioning step, the placed surface is oriented so as to have the far vision part of the progressive multifocal ophthalmic lens facing the at least part of the surface of the blocking ring. In other words, the parameter corresponding to the rotation about the main axis Z is so that the placed surface is oriented so as to have the far vision part of the progressive multifocal ophthalmic lens facing the bearing zone of the blocking ring. According to such embodiment, the optical lens may be placed so that the clamping arm in the clamping position pushes against the far vision part of the progressive multifocal ophthalmic lens. Since the far vision part of the progressive multifocal ophthalmic lens has a surface close to a sphere, the contact between the optical surface and the blocking ring is easier and the risk of a having some of the cast material leaking during the blocking steps is reduced.

During the repositioning step S6, the placed surface is virtually translated along the main axis Z and virtually rotated about the two perpendicular axes X and Y. In other words, a new position of the placed surface is evaluated by changing the values of the position parameter TZ corresponding to the translation along the main axis Z and the parameters RX and RY corresponding to the rotation about the perpendicular axis X and Y. Here, by "virtually", one intends "by calculations performed for example by computer means".

The difference in position along the main axis Z between each of the sampling points of the bearing zone and the placed surface of the optical lens re-positioned is determined during the altitude determining step S7. At this step, a difference of position along the main axis Z between every sampling point and the placed surface is evaluated and a global difference in position between blocking ring and placed surface of lens member in the virtual position is evaluated.

The repositioning and altitude determining steps S6 and S7 are repeated so as to minimizing the global difference in position along the main axis between the sampling points and the placed surface of the optical lens member and by imposing that for each sampled point the distance with the placed surface of the optical lens is greater than or equal to zero.

Advantageously, the calculations duration is reduced by a low number of sampling points on the bearing zone.

According to an embodiment of the invention, the optimization according to the invention may be implemented by using a method of least squares.

Once the optimization is over, the values of the position parameters TZ, RX, and RY combined with the values of the position parameters RZ, TX and TY, allows having an accurate position for the placed surface with respect to the blocking ring and then to the lens blocker. Thus, when machining the second surface of the optical lens member, the positioning errors between the two optical surfaces of the lens can be reduced.

Although presented as an iterative process, it will be appreciated that optimization used in the method of the invention may be of any type known of the person skilled in the art.

The method according to the invention may be used before having physically blocked the optical lens member, so as to determine in advance the blocking position knowing three positioning parameters. Therefore, the position parameters may be pre-calculated parameters corresponding to the values of the parameters that should be used when placing the lens blank on the blocking ring considering the surface of the lens blank to be placed on the blocking ring.

The method according to the invention allows determining the complementary position parameters and therefore, the exact position of the optical lens member when placed on the blocking ring. Thus, one may determine the positioning error, i.e. the difference in position between the actual optical lens member position and the desired optical lens member position. For example, such positioning error may introduce for example an unwanted prism. Such unwanted prism should be considered either when blocking the lens or when manufacturing the lens so as to limit the prismatic error.

According to a further embodiment, the position parameters may be parameters measured after the operator has placed and clamped the lens member on the blocking ring. Using reference markings 111 located on the first surface of the lens member, one may measure the three position parameters. The method according to the invention allows from the three position parameters TX, TY, RZ to determine the three complementary position parameters TZ, RX, RY and thus to determine the exact position of the first surface of the optical lens member in the reference system.

Advantageously, the overall accuracy of the manufacturing method is increased.

Figure 7:
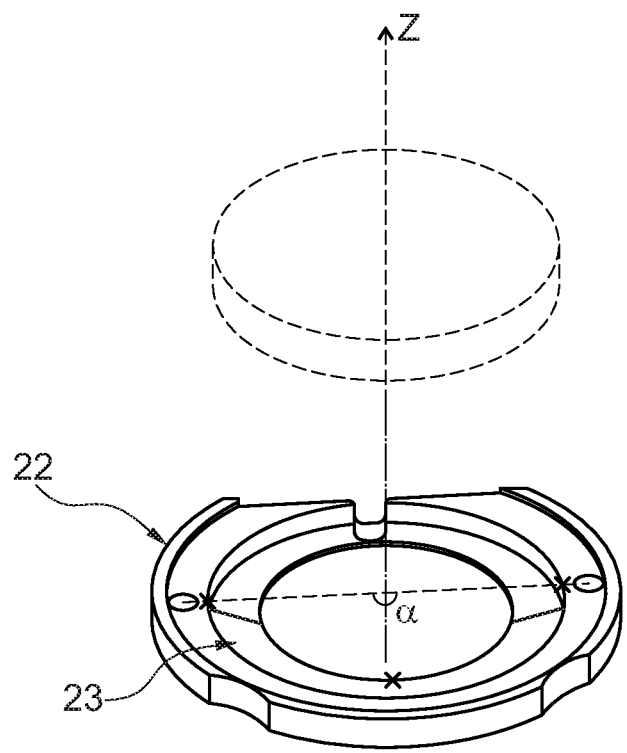
FIG. 7 is a perspective view of a blocking ring.
Figure 8:
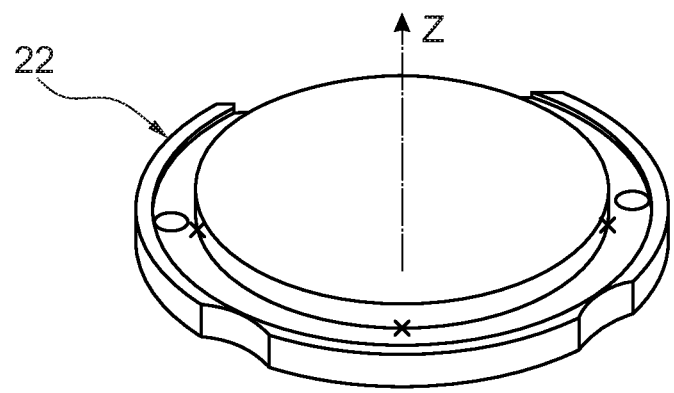
FIG. 8 is a perspective view of a blocking ring and an optical lens member.

As illustrated in FIGS. 7 and 8, three points of the bearing zone are represented. Moreover, in FIG. 7, the at least three points of the bearing zone are located on an arc of the blocking ring having an angle α greater than or equal to 60°, here around 180°.

While the foregoing examples have been described with reference to the manufacture of an ophthalmic lens, it will be appreciated that the method of the invention may be applied more generally to the manufacture of other types of optical lens, for example optical lens used in telescopes and the like, or contact lens.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method implemented by computer means, for determining a position of an optical lens member having a surface placed on a lens blocking ring, the blocking ring comprising a bearing zone arranged to bear at least partially the placed surface of the optical lens member when said optical lens member is placed on the lens blocking ring, the method comprising:
   a reference system providing step during which a reference system is provided, the reference system comprising a main axis perpendicular to a main plane defined by two axes perpendicular to each other and to the main axis;
   blocking ring surface data providing step during which blocking ring surface data representing, in the reference system, a plurality of at least three points of the surface of the bearing zone, is provided;
   an optical lens member surface data providing step, during which optical lens member surface data is provided, the optical lens member surface data representing, in the reference system, the placed surface of the optical lens member to be placed on the blocking ring;
   a position parameters providing step during which position parameters are provided, the position parameters defining a position of a reference point of the placed surface with respect to the main plane of the reference system and an orientation, about the main axis of said placed surface at said reference point;
   an initial position determining step during which the position of the placed surface of the optical lens member is determined according to the position parameters;
   a repositioning step during which the placed surface is virtually translated along the main axis and rotated about the two perpendicular axes, from said initial position, to be set in a virtual position; and
   an altitude determination step during which a difference in position along the main axis between each of the points of the blocking ring surface data and the placed surface of the optical lens member in said virtual position is determined;
   wherein the repositioning and altitude determining steps are repeated so as to minimize the difference in position along the main axis between the points of the blocking ring surface data and the placed surface of the optical lens member and by imposing that for each point of the blocking ring surface data, the distance in position along the main axis with the placed surface of the optical lens member is greater than or equal to zero for determining complementary position parameters of the optical lens member.

2. The method according to claim 1, wherein the bearing zone of the blocking ring has a circular shape.

3. The method according to claim 2, wherein the blocking ring surface data comprise points arranged so that they are spaced by an angular distance greater than or equal to 0.5 degree and smaller than or equal to 2 degrees, the angular distance being defined by the intersection of the lines passing through the points and a center of the blocking ring.

4. The method according to claim 1, wherein the bearing zone of the blocking ring is comprised in a plane perpendicular to the main axis.

5. The method according to claim 1, wherein the points of the bearing zone are located on an arc of the blocking ring having an angle greater than or equal to 60°, the summit of the arc of the blocking ring being positioned at a geometrical center of the bearing zone.

6. The method according to claim 1, wherein the optical lens member surface data is a representation at least twice derivable of the placed surface.

7. The method according to claim 1, wherein the placed surface is an aspherical surface.

8. The method according to claim 1, wherein the optical lens member is used to manufacture an ophthalmic lens.

9. The method according to claim 8, wherein the ophthalmic lens is a progressive multifocal ophthalmic lens and the reference point of the placed surface is a prism reference point of the progressive multifocal ophthalmic lens.

10. The method according to claim 9, wherein during the initial positioning step, the placed surface is oriented so as to have the near vision part of the progressive multifocal ophthalmic lens facing the bearing zone.

11. The method according to claim 9, wherein during the initial positioning step, the placed surface is oriented so as to have the far vision part of the progressive multifocal ophthalmic lens facing the bearing zone.

12. The method according to claim 1, wherein the position parameters are measured on the optical lens member when the optical lens member is placed on the blocking ring.

13. A method of manufacturing an optical surface of an optical lens comprising:
   an optical lens member providing step, during which an optical lens member having a first optical surface and a second optical surface to be manufactured is provided;
   a blocking step during which the first surface of the optical lens member is placed on a blocking ring and blocked to a holding lens member; and
   a manufacturing step during which the second surface of the optical lens is manufactured according to manufacturing parameters,
   wherein the position of the first surface of the optical lens member on the blocking ring at the blocking step is determined using a method according to claim 1;
   wherein the manufacturing parameters are determined from the position parameters and the complementary position parameters determined when carrying out the method according to claim 1.

14. A non-transitory computer program product comprising one or more stored sequences of instructions that are accessible to a processor and which, when executed by the processor, causes the processor and an optical lens manufacturing device to carry out the steps of claim 13.

15. A non-transitory computer readable medium carrying one or more sequences of instructions of the non-transitory computer program product of claim 14.

16. A non-transitory computer program product comprising one or more stored sequences of instructions that are accessible to a processor and which, when executed by the processor, causes the processor to carry out the steps of claim 1.

17. A non-transitory computer readable medium carrying one or more sequences of instructions of the non-transitory computer program product of claim 16.

\* \* \* \* \*